US006629175B1

(12) United States Patent
Manning et al.

(10) Patent No.: US 6,629,175 B1
(45) Date of Patent: Sep. 30, 2003

(54) EFFICIENT ADAPTER CONTEXT SWITCHING

(75) Inventors: Sidney James Manning, Austin, TX (US); James Anthony Pafumi, Leander, TX (US); Robert Paul Stelzer, Austin, TX (US); Timothy Howard White, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/550,182

(22) Filed: Apr. 14, 2000

(51) Int. Cl.$^7$ .................. G06F 12/14; G06F 9/00; G06F 9/54
(52) U.S. Cl. .................. 710/200; 709/310; 709/100
(58) Field of Search .................. 710/52, 107, 108, 710/200, 220, 109, 262; 709/104, 102, 103, 107, 108, 321–327; 712/226; 345/552, 541, 502, 582

(56) References Cited

U.S. PATENT DOCUMENTS

| | | | | |
|---|---|---|---|---|
| 5,752,032 A | * | 5/1998 | Keller et al. | 709/311 |
| 5,826,073 A | * | 10/1998 | Ben-Meir et al. | 712/226 |
| 5,893,912 A | * | 4/1999 | Freund et al. | 707/103 R |
| 5,983,292 A | * | 11/1999 | Nordstrom et al. | 709/321 |
| 6,173,309 B1 | * | 1/2001 | Kirshenbaum et al. | 709/107 |
| 6,173,377 B1 | * | 1/2001 | Yanai et al. | 711/154 |
| 6,179,489 B1 | * | 1/2001 | So et al. | 709/102 |
| 6,208,361 B1 | * | 3/2001 | Gossett | 345/536 |
| 6,223,204 B1 | * | 4/2001 | Tucker | 709/100 |
| 6,314,563 B1 | * | 11/2001 | Agesen et al. | 709/104 |

OTHER PUBLICATIONS

"Give a Process to your Drivers", Francois Armand, Chorus systemes, Sep. 1991.*

* cited by examiner

Primary Examiner—Glenn A. Auve
Assistant Examiner—Trisha Vu
(74) Attorney, Agent, or Firm—Joseph P. Lally; Mark E. McBurney

(57) ABSTRACT

A method and system for controlling access to an adapter, such as a graphics adapter, are disclosed. The method includes querying an adapter lock with a first thread. Thereafter, responsive to determining that the lock indicates the first thread does not have access to the adapter, a sequence to obtain access to the adapter is initiated where the sequence includes writing the adapter context corresponding to the first thread. The, sequence may include a ring 3 to ring 0 transition. The method also includes, in response to determining that the lock indicates the first thread has access to the adapter, communicating to the adapter with the first thread without invoking the sequence to obtain access to the adapter. In one embodiment, querying the adapter lock includes writing a first word of the adapter lock using an atomic operation. The method may further include writing a set of command buffers with the first thread and, responsive to determining that the first has access to the adapter, transferring the commands buffers to the adapter. In one embodiment, the sequence to obtain access to the adapter includes the first thread obtaining ownership of a mutex lock prior to updating the adapter context. The sequence to obtain access to the adapter may include updating the adapter lock status to indicate the first thread having access to the adapter.

17 Claims, 3 Drawing Sheets

EFFICIENT ADAPTER CONTEXT SWITCHING

BACKGROUND

1. Field of the Present Invention

The present invention relates to the field of computer graphics and more particularly to a method and system for managing a complex graphics state on an adapter supporting multiple threads running in a windowing-type operating system environment.

2. History of Related Art

Graphics adapters have become a standard I/O peripheral device for microprocessor based computing systems. Some graphics adapters incorporate the ability to rastorize graphic primitives using state information that specify graphics attributes, such as pixel depth, that are set by graphics commands. Theses attributes are referred to as the adapter context. For these graphic adapters, software must insure that when a thread sends commands to the adapter, the commands are interpreted using the correct adapter context. In addition, software must insure that only one thread accesses the adapter at any given time.

Many widely distributed operating systems enable multi-tasking operation in which two or more application programs are executing simultaneously. Typically, each application program may spawn one or more threads where each thread is dedicated to a specific task. In addition, most multi-tasking operating systems provide a protection mechanism to prevent application programmers from accessing or otherwise modifying code that is essential to the operating system. In a Windows® environment, for example, a protection mechanism is provided by assigning application code to one of four hierarchical "rings," rings 0 through 3, where ring 0 code is the most highly protected code (accessible only to other ring 0 code) and ring 3 code is the least protected code (accessible to code of all rings). In a similar manner, Unix® systems utilize a "kernel" mode and a "user" mode. While the present disclosure is described with frequent references to the ring protection mechanism of the Windows® operating system, it is to be understood that the invention is not limited to a Windows® implementation and is generally applicable to any multi-tasking operating system employing some manner of protection mechanism.

In a Windows® operating environment, conventional application software is typically written as ring 3 code. At the other end of the spectrum, the core operating system routines and tasks including device drivers that are designed to configure settings on various peripheral devices are ring 0 code. If a ring 3 application program requires the use of ring 0 code, the operating system provides a mechanism by which the ring 3 code can make a call that will result in the execution of ring 0 code. Typically, the ring 3 to ring 0 transition is a time consuming and expensive transition because the operating system must initiate a sequence of complex subroutine calls. Each of these subroutine calls typically require the operating system to store the context of the calling subroutine for later retrieval. It will be appreciated by those familiar with the most common multi-tasking operating systems that it is desirable to avoid ring 3 to ring 0 transitions whenever possible. In the area of high performance computer graphics, minimizing the number of such transitions can determine the ultimate performance of the graphics application. When multiple threads that access the adapter, each with its own corresponding adapter context, are running simultaneously, the task of re-instating the appropriate adapter context that each thread must perform prior to sending adapter commands negatively affects system performance. This is especially true in memory protected operating systems in which a transition from application code to core code is initiated with each change of adapter context. Therefore, it would be highly desirable to implement a method and system that minimized operating system overhead while supporting multi-threaded graphics execution.

SUMMARY OF THE INVENTION

The problems identified above are address by a method and system for controlling access to an adapter, such as a graphics adapter. The method includes querying an adapter lock with a first thread. Thereafter, responsive to determining that the lock indicates the first thread does not have access to the adapter, a sequence to obtain access to the adapter is initiated where the sequence includes writing the adapter context corresponding to the first thread. The sequence includes a ring 3 to ring 0 transition. The method also includes, in response to determining that the lock indicates the first thread has access to the adapter, communicating to the adapter with the first thread without invoking the sequence to obtain access to the adapter. In one embodiment, querying the adapter lock includes writing a first word of the adapter lock using an atomic operation. The method may further include writing a set of command buffers with the first thread and, responsive to determining that the first has access to the adapter, transferring the commands buffers to the adapter. In one embodiment, the sequence to obtain access to the adapter includes the first thread obtaining ownership of a mutex lock prior to updating the adapter context. The sequence to obtain access to the adapter may include updating the adapter lock status to indicate the first thread having access to the adapter.

The invention further contemplates a data processing system that includes a processor, a bus bridge, and an adapter. The processor has access to a system memory via a system bus. The bus bridge is connected between the system bus and a peripheral bus. The adapter, such as a graphics adapter is connected to the peripheral bus. In one embodiment, the system memory contains a display driver suitable for modifying the context of the adapter and user code suitable for writing a set of command buffers that are executable by the adapter. The system memory preferably further includes a routine suitable for querying an adapter lock to determine if the user code has access to the adapter in response to the user code indicating that a set of command buffers is ready to be transferred to the adapter. In this manner the set of command buffers can be transferred to the adapter without invoking the display driver to modify the adapter context or placing context restoring commands at the start of each command buffer.

BRIEF DESCRIPTION OF THE DRAWINGS

Other objects and advantages of the invention will become apparent upon reading the following detailed description and upon reference to the accompanying drawings in which.

Figure 1:
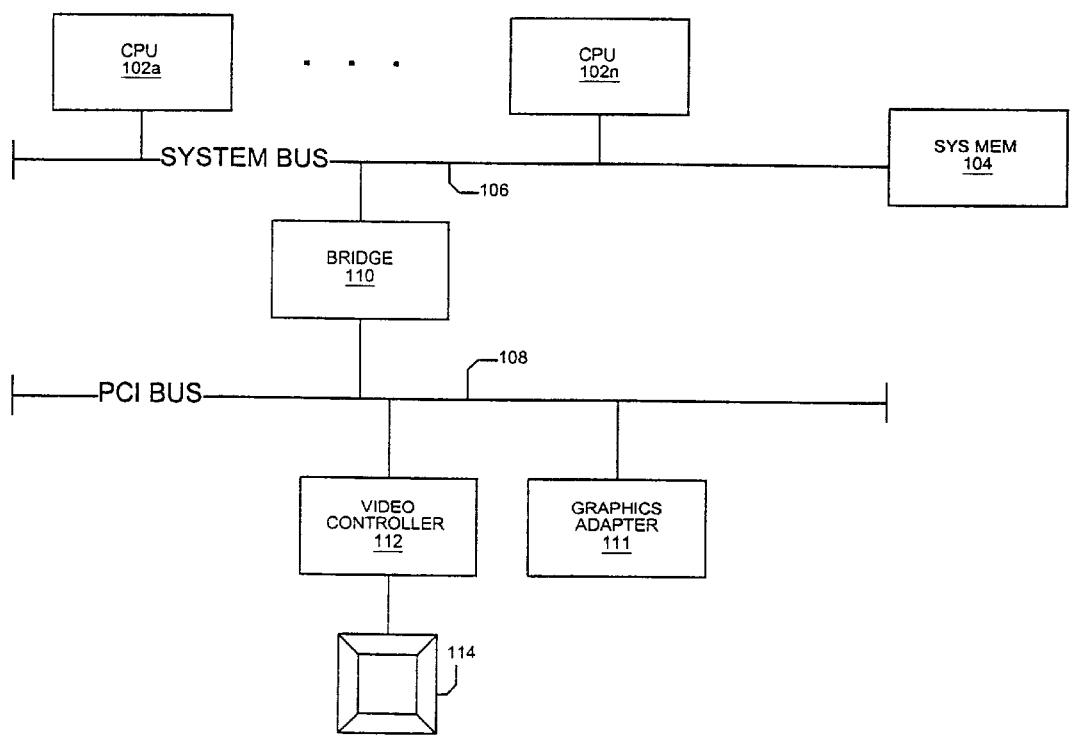
FIG. 1 is a simplified block diagram of a computer system suitable for implementing the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Turning now to the drawings, FIG. 1 is a block diagram of selected elements of a computer system 100 that is suitable for implementing the present invention. As depicted in FIG. 1, system 100 includes one or more processors 102a through 102n (collectively or generically referred to herein as processor(s) 102). Processors 102 may comprise any of a variety of commercially distributed general purpose microprocessors including, as examples, PowerPC® from IBM Corporation, Sparc® microprocessor from Sun, 68000 microprocessors from Motorola, and x86 family microprocessors available from a number of sources, including Intel Corporation and Advanced Micro Devices. Each of the processors 102 communicates with a system memory 104 over the system bus 106. In a common arrangement, a system bus 106 is coupled to a peripheral bus 108 through a bus bridge 110. The peripheral bus 108 may be compliant with any of a variety of industry standard peripheral buses including, as an example, the Peripheral Component Interface (PCI) bus as defined in PCI Local Bus Specification Rev. 2.2 available from the PCI Special Interest Group at www.pcisig.com and incorporated by reference herein. The peripheral bus 108 connects one or more peripheral devices to system bus 106 through bridge 110. The depicted embodiment of system 100 indicated a graphics adapter 111 connected to peripheral bus 108. Graphics adapter 111 is configured to improve the performance of a variety of graphics applications. Typically, graphics adapter 111 in conjunction with a video controller 112, which can be integrated with graphics adapter 111, is responsible for generating the image that is displayed on display device 114. The graphics adapter 111 is responsible for maintaining the content of a dedicated memory facility referred to as the frame buffer, which contains a digital representation of the image to be displayed on the display device. Portions of the invention may be implemented as a set of computer instructions suitable for execution by processor 102. During execution, the set of instructions preferably resides in system memory 104 or in a cache memory (not depicted) associated with processor 102. At other times, the set of instructions may reside on an alternative computer readable medium such as a hard disk, floppy diskette, CD ROM, magnetic tape, or other suitable medium.

Figure 2:
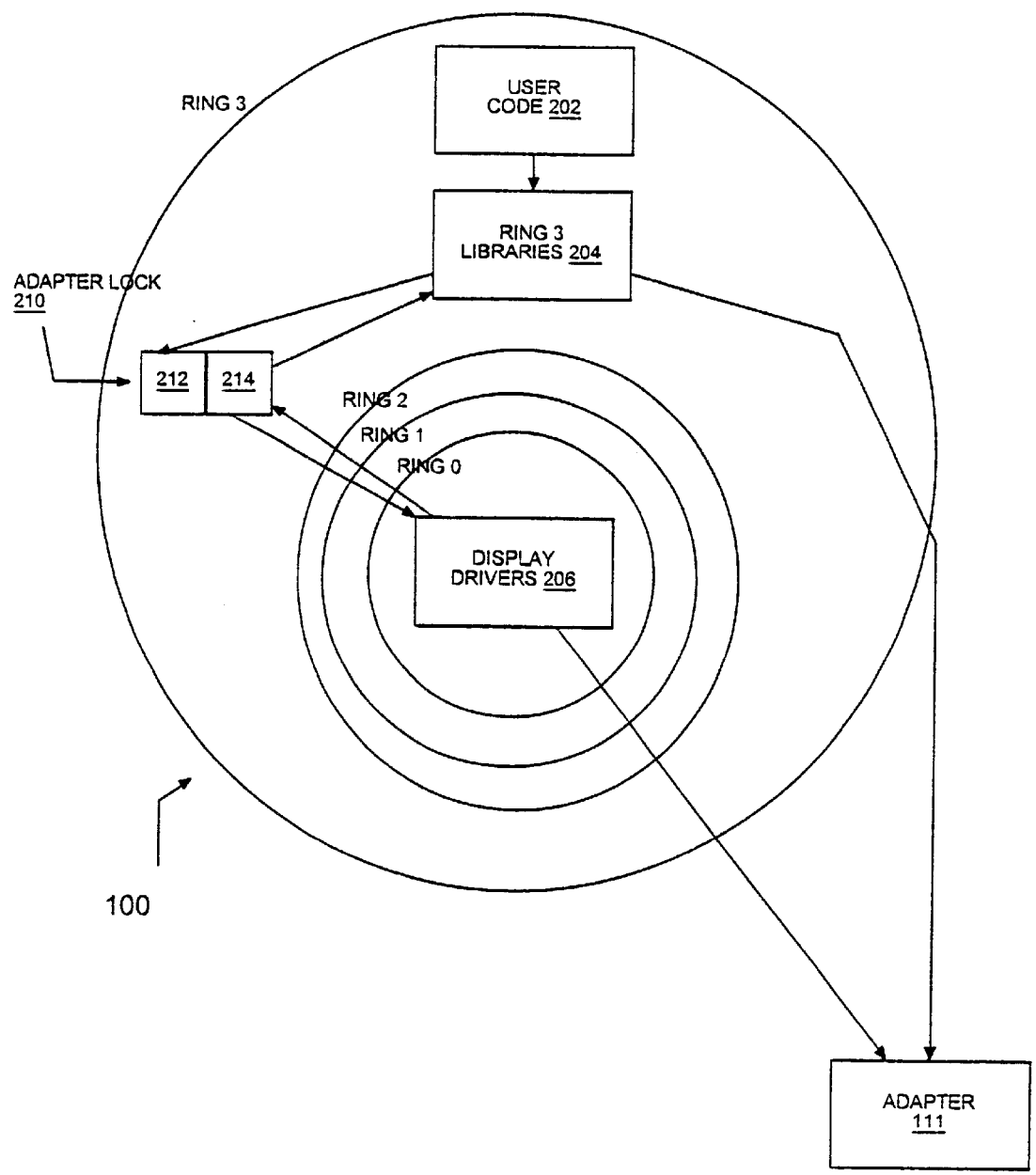
FIG. 2 is a representation of the memory space in one embodiment of the computer system of FIG 1.

Turning now to FIG. 2, a conceptualized illustration of the memory space of a data processing system 100 according to one embodiment of the invention is depicted. As illustrated in FIG. 2, the memory space is divided into hierarchical levels indicated by the 4 concentric circles labeled in FIG. 2 as ring 0, ring 1, ring 2, and ring 3. In this arrangement, each ring indicates a level of protection for instruction and data code corresponding to that ring, with ring 0 representing the highest level of protection and ring 3 representing the lowest level of protection. Ring 0 memory space, for example, can be accessed by ring 0 code only. Ring 3 memory space, on the other hand, is accessible to ring 0 code, ring 1 code, and ring 2 code (as well as ring 3 code). Ring 0 code typically includes core operating system tasks and subroutines. Access to selected ring 0 routines is provided to ring 3 code through highly structured gates, as will be familiar with those knowledgeable in the development of applications for Windows® and other multi-tasking operating systems. As depicted in FIG. 2, ring 3 code includes user code 202 and a set of ring 3 libraries 204. User code 202 represents an application program written with a high level programming language such as, for example, C++. User code 202, for purposes of the present invention, is a graphics application that is written, or at least partially written, to achieve some desired effect with respect to the display device 114 of system 100. Typically, user code 202 is written in conjunction with a particular application program interface (API) such as OpenGL® from Silicon Graphics, Inc. that provides a standardized set of instructions or subroutines that directly manipulate graphics adapter hardware. A portion of these API subroutines are indicated in FIG. 2 by the ring 3 libraries 204.

Figure 3:
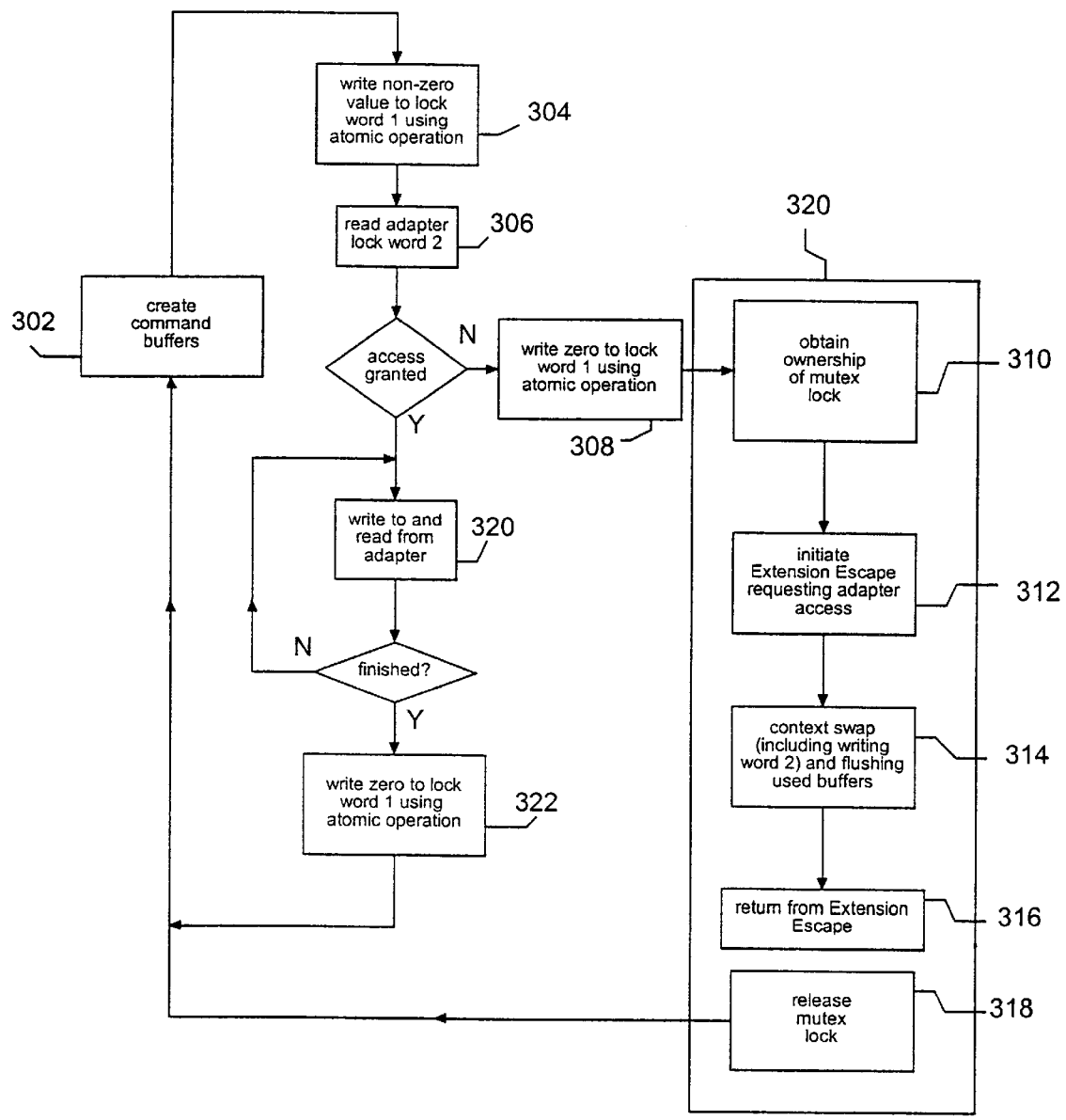
FIG. 3 is a flow diagram of a method for minimizing operating system overhead according to one embodiment of the present invention.

For purposes of the present invention, user code 202 is responsible for generating a set of command buffers as indicated in block 302 of FIG. 3, which presents a flow diagram of the operation of system 100 as contemplated herein. The command buffers generated by user code 202 are eventually flushed or otherwise transferred to graphics adapter 111. As stated previously, each application or thread issues instructions to graphics adapter 111 that assume a specific adapter context. The adapter context corresponding to a first thread may be different than the adapter context corresponding to a second thread. In other words, a first thread may issue commands based on a first set of adapter attributes whereas a second thread may issue commands based on a second set of adapter attributes. Therefore, whenever execution switches from one thread to another thread, the system must ensure that graphics adapter 111 is programmed with the appropriate state or context. In a conventional system, the responsibility for maintaining or modifying the adapter context lies with ring 0 code referred to herein as display driver 206. In a conventionally designed system, display driver 206 must be invoked each time a new thread attempts to access graphics adapter 111 in order to restore the appropriate adapter context and to insure that the thread has exclusive access to the adapter. Unfortunately, invoking display driver 206 from user code 202 is a time consuming and expensive proposition in many multi-tasking operating systems because of the ring 3 to ring 0 transition that occurs with each such invocation of display driver 206. In a Windows® operating system environment, for example, each thread is allocated a time slice during which that thread has priority of execution. If an executing thread must call into ring 0 prior to each adapter access, a significant portion of the thread's time slice may be consumed by the ring 3 to ring 0 transitions. Worse yet, with each such transition, the operating system may prematurely revoke the thread's priority of execution and start executing some other thread. The present invention contemplates improving performance by enabling the user code 202 and ring 3 libraries 204 to flush command buffers down to graphics adapter 111 without first invoking display driver 206.

Referring to both FIG. 2 and FIG. 3, one embodiment of an implementation suitable for achieving this performance improvement is depicted. The depicted embodiment utilizes an adapter lock 210 that is accessible to ring 3 code such as the ring 3 libraries 204, which may be dynamically linked with user code 202 (i.e., ring 3 libraries may represent one or more "dll" files used by user code 202). Adapter lock 210, according to the depicted embodiment, includes a first word 212 and a second word 214. When a particular thread represented by user code 202 has generated a set of command buffers that are ready to be transferred to adapter 111, it will first attempt to determine if it currently has access to graphics adapter 111. If user code 202 determines that it does not have access to graphics adapter 111, it will initiate a process to obtain access to graphics adapter 111 by invoking display driver 206 to write the appropriate context to the adapter and to flush the set of command buffers (i.e., transfer the command buffers from system memory 104 to the adapter). If, on the other hand, the user code 202 determines that it does have access to the adapter, it can begin to flush its command buffers to the adapter without first initiating the undesirably time consuming access control and context swapping sequence. In the depicted embodiment, user code 202 (in conjunction with ring 3 libraries 204) determines whether it has access to graphics adapter 111 by writing a non-zero value to first word 212 in adapter lock 210 using an atomic operation. By software design, the second word 214 cannot be changed while first word 212 is non-zero. This mechanism provides a means of assuring that only one thread or application in a multi-tasking environment has access to graphics adapter 111. After writing to first word 212, user code 202 will then read second word 214 in step 306 to determine if it has access to graphics adapter 111. Display driver 206 is responsible for writing second word 214 with a value indicating if the thread currently has access to graphics adapter 111.

If the user code 202 (through its dynamically linked libraries 204), finds that it does not have access to graphics adapter 111, a process is initiated to obtain access to graphics adapter 111 and to flush the user codes commands buffers to the adapter. Initially, first word 212 is set to zero to permit display driver 206 to update the contents of second word 214. Then, user code 202 obtains ownership of a mutually exclusive (mutex) lock in step 310. While mutex locks typically provide a mechanism for controlling access to a shared data structure, the present design uses the mutex lock for its side effect concerning thread execution scheduling. To wit: when two or more threads request ownership of a mutex lock, the operating system must elevate the priority of the thread given the lock relative to the thread(s) requesting the lock. Thus, by obtaining the mutex lock before requesting access to the adapter, a thread is more likely to retain its time slice and lengthen the period during the time slice that its graphics context is loaded on the adapter. Additional information concerning one implementation of mutex locks is available on the Microsoft software developer's kit at www.microsoft.com/msdn. After obtaining the mutex lock in step 310, a controlled subroutine call is initiated to invoke display driver 206 in step 312 to request access to the adapter. In an implementation of the invention suitable for operation in a Windows® environment, this controlled call to ring 0 code may be suitably managed with an extension escape call. In response to the extension escape, display driver 206 writes the adapter context corresponding to user code 202 to the adapter. In the preferred embodiment, the context of the thread that previously had access to the adapter in step 314 is saved in memory. In this manner, adapter 111 is "virtualized" such that each thread is freed from the task of ensuring that the adapter state is current. In addition, the extension escape routine flushes the command buffers generated by user code 202 to reduce or eliminate thrashing (working in tandem with the mutex lock discussed earlier to greatly improve performance) and updates the contents of second word 214 of adapter lock 210 to indicate that user code 202 is the thread with current access to graphics adapter 111. A return from the extension escape occurs in step 316 and the mutex lock is released in step 318. User code 202 is then free to create additional commands buffers in step 302.

If user code 202 determines in step 306 that it has access to adapter 111, it can simply begin to dump command buffers (step 321) to adapter 111 without invoking the sequence of steps indicated by the box 320 in FIG. 3. When the user code completes its sequence with graphics adapter 111, it will write a zero to first word 212 using an atomic operation thereby permitting other threads to attempt to gain access to graphics adapter 111. If user code 202 is operating in a time-sliced multi-tasking environment, other threads may obtain system priority after user code 202 has completed its sequence with graphics adapter 111. If these other threads do not request access to adapter 111, user code 202 may find (by querying adapter lock 210) during a subsequent time slice that it still has access to graphics adapter 111. When this is true, the invention enables the user code 202 to bypass sequence 320 and to begin communicating immediately with the adapter 111. Because all of the events in sequence 320 may invoke a ring 3 to ring 0 transition, it is highly desirable to minimize the number of times sequence 320 is invoked. The present invention beneficially achieves this objective by providing a mechanism through which a system efficiently manages access to adapter 111.

It will be apparent to those skilled in the art having the benefit of this disclosure that the present invention contemplates a method and system for managing the context control of a graphics adapter in a multi-tasking environment. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of controlling access to an adapter comprising,
    writing a set of command buffers with a first thread;
    querying an adapter lock with the first tread;
    responsive to determinig that the lock indicates the first thread not having access to the adapter, initiating a sequence to obtain access to the adapter, wherein the sequence includes writing the adapter context corresponding to the first thread; and
    responsive to determinig that the lock indicates the first thread having access to the adapter, transferring the set of command buffers to the adapter using code having a single protection level to prevent a protection level transition form occurring during said transferring.

2. The method of claim 1, wherein querying the adapter lock comprises writing a first word of the adapter lock using an atomic operation.

3. The method of claim 1, wherein the adapter comprises a graphics adapter.

4. The method of claim 1, wherein the sequence to obtain access to the adapter includes the first thread obtaining ownership of a mutex lock prior to updating the adapter context.

5. The method of claim 1, wherein the sequence to obtain access to the adapter includes updating the lock status to indicate the first thread having access to the adapter.

6. The method of claim 1, wherein the sequence to obtain access to the adapter comprises invoking a ring 0 display driver.

7. A computer program product comprising a computer readable medium containing a set of instructions executable by a processor, the set of instructions comprising:

code means for writing a set of command buffers;

code means for querying an adapter lock with a first thread; code means for initiating a sequence to obtain access to the adapter responsive to the lock indicating the first thread not having access to the adapter, wherein the sequence includes writing the adapter context corresponding to the first thread to the adapter; and responsive to the lock indicating the first thread having access to the adapter, code means for transfering the set of command buffers to the adapter using code having a single protection level t o prevent a protection level transition from occurring during said transferring.

8. The computer program product of claim 7, wherein the means for querying the adapter lockcomprises means for writing a first word of the adapter lock using an atomic operation.

9. The computer program product of claim 7, wherein the sequence to obtain access to the adapter includes the first thread obtaining ownership of a mutex lock prior to updating the adapter context.

10. The computer program product of claim 7, wherein the sequence to obtain access to the adapter includes updating the lock status to indicate the first thread having access to the adapter.

11. The computer program product of claim 7, wherein the sequence to obtain access to the adapter comprises invoking a ring 0 display driver.

12. A data processing system, comprising:

an adapter having a context, connected to a peripheral bus;

a system memory coupled with a system bus, comprising
      a display driver suitable for modifying the context of the adapter;
      a user code suitable for writing a content to a set of command buffers, the content being suitable for execution by the adapter; and
      a routine suitable to query an adapter lock in response to an indication via the user code, that the content is suitable for writing to the adapter, to determine if the user code has access to the adapter;

a processor with access to the system memory via the system bus, to execute the routine to avoid modifying the context via a ring 3 to ring 0 transition when transferring the content to the adapter if the user code has access to the adapter; and a bus bridge connected between the system bus and the peripheral bus.

13. The system of claim 12, wherein the querying the adapter lock comprises acquiring an atomic operation.

14. The system of claim 12, wherein the system memory further includes a sequence for obtaining access to the adapter, wherein the sequence includes invoking the display driver to write the adapter context corresponding to the user code.

15. The system of claim 12, wherein the sequence includes obtaining ownership of a mutex lock prior to writing the adapter context.

16. The system of claim 12, wherein the adapter comprises a graphics adapter suitable for maintaining a frame buffer associated with a display device.

17. The system of claim 12, wherein invoking the display driver to modify the adapter context includes a transition from ring 3 to ring 0 code.

* * * * *

UNITED STATES PATENT AND TRADEMARK OFFICE
CERTIFICATE OF CORRECTION

PATENT NO.     : 6,629,175 B1
DATED          : September 30, 2003
INVENTOR(S)    : Sidney James Manning et al.

It is certified that error appears in the above-identified patent and that said Letters Patent is hereby corrected as shown below:

<u>Title page,</u>
Item [57], ABSTRACT,
Line 1, delete "The," and insert -- The --;

<u>Drawings,</u>
Sheet 1, FIG. 1, the reference numeral "100" should be applied to the computer system.
Sheet 3, FIG. 3, the reference numeral "320" should be replaced with reference numeral -- 321 --.

<u>Column 6,</u>
Line 42, delete "tread" and insert -- thread --.
Line 52, delete "form" and insert -- from --.

<u>Column 7,</u>
Line 13, delete "transfering" and insert -- transferring --.
Line 15, delete "t o" and insert -- to --.
Line 18, delete "lockcomprises" and insert -- lock comprises --.

Signed and Sealed this

Eighth Day of June, 2004

JON W. DUDAS
*Acting Director of the United States Patent and Trademark Office*